(12) United States Patent
Francis

(10) Patent No.: US 8,277,079 B2
(45) Date of Patent: Oct. 2, 2012

(54) BORESIGHT COLLIMATING DEVICE FOR WIDE WAVEBAND UTILIZING A SOURCE SWITCHING ELLIPTICAL REFLECTOR

(75) Inventor: Michael Francis, Morrison, CO (US)

(73) Assignee: Ocean Thin Films, Inc., Largo, FL (US)

( * ) Notice: Subject to any disclaimer, the term of this patent is extended or adjusted under 35 U.S.C. 154(b) by 421 days.

(21) Appl. No.: 12/799,493

(22) Filed: Apr. 26, 2010

(65) Prior Publication Data
US 2010/0277912 A1 Nov. 4, 2010

Related U.S. Application Data

(60) Provisional application No. 61/215,350, filed on May 4, 2009.

(51) Int. Cl.
*B60Q 1/26* (2006.01)
(52) U.S. Cl. ........ 362/232; 362/227; 362/343; 362/346; 362/347
(58) Field of Classification Search .................. 362/227, 362/232, 234–236, 249.01–249.03, 249.07–249.11, 362/277–284, 296.01–298, 296.05–296.1, 362/343, 346–347
See application file for complete search history.

*Primary Examiner* — William Carter
(74) *Attorney, Agent, or Firm* — Dennis L. Cook, Esq.

(57) ABSTRACT

A boresight collimating device using a novel way of achieving multiple source illumination of the pin hole/reticule using one moving part, a rotating elliptical mirror, while maintaining precision alignment of the device is disclosed.

2 Claims, 2 Drawing Sheets

BORESIGHT COLLIMATING DEVICE FOR WIDE WAVEBAND UTILIZING A SOURCE SWITCHING ELLIPTICAL REFLECTOR

CROSS-REFERENCE TO RELATED APPLICATION

The present application claims the benefit of previously filed Provisional Patent Application Ser. No. 61/215,350.

FIELD OF THE INVENTION

This invention belongs to the field of manufacture of boresight collimating devices. More specifically it is a novel way of achieving multiple source illumination of a pin hole/reticule using one moving part, an elliptical mirror, while maintaining precision alignment of the device.

BACKGROUND OF THE INVENTION

The challenges of designing an optical system that operates effectively over such a wide waveband are great, typically incurring high levels of complexity and exotic materials. This design concept utilizes powered mirrored surfaces to overcome the need for either a complex system or extensive use of exotic materials such as those disclosed in U.S. Pat. Nos. 6,950,243, 6,765,663, or 6,020,994.

Typically the imaging side of the system is the most sensitive for maintaining alignment and therefore cannot employ moving mechanical components. The illumination side of the system is not as sensitive to alignment and can employ moving component(s) to achieve the design goals. This disclosure surpasses existing designs that, while being capable of achieving these goals, have removable parts that are commonly misplaced/lost. Improvement of the design as described in this disclosure will reduce the overall cost of operating a wide waveband boresight instrument in the field.

BRIEF SUMMARY OF THE INVENTION

This invention is a novel way of achieving multiple source illumination of a pin hole/reticule using one moving part, a rotating elliptical mirror, while maintaining precision alignment of the device.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

The preferred embodiment of the invention discloses a boresight apparatus for field sighting-in of small arms utilizing sights/scopes that operate at ~550 nm, 890 nm, near infrared (NIR) and far infrared (FIR) wavelengths without interchangeable/removable parts.

In boresight collimating devices mirrored surfaces are inherently achromatic and can be used in place of exotic materials where a wide waveband is needed. These mirrors need to have optically powered surfaces that are either spherical, parabolic, elliptical, aspheric, etc. Typically the system needs several focused light sources to produce the necessary illumination, yet there is not room for multiple reflective surfaces to achieve illumination of the pinhole in the system.

Figure 1:
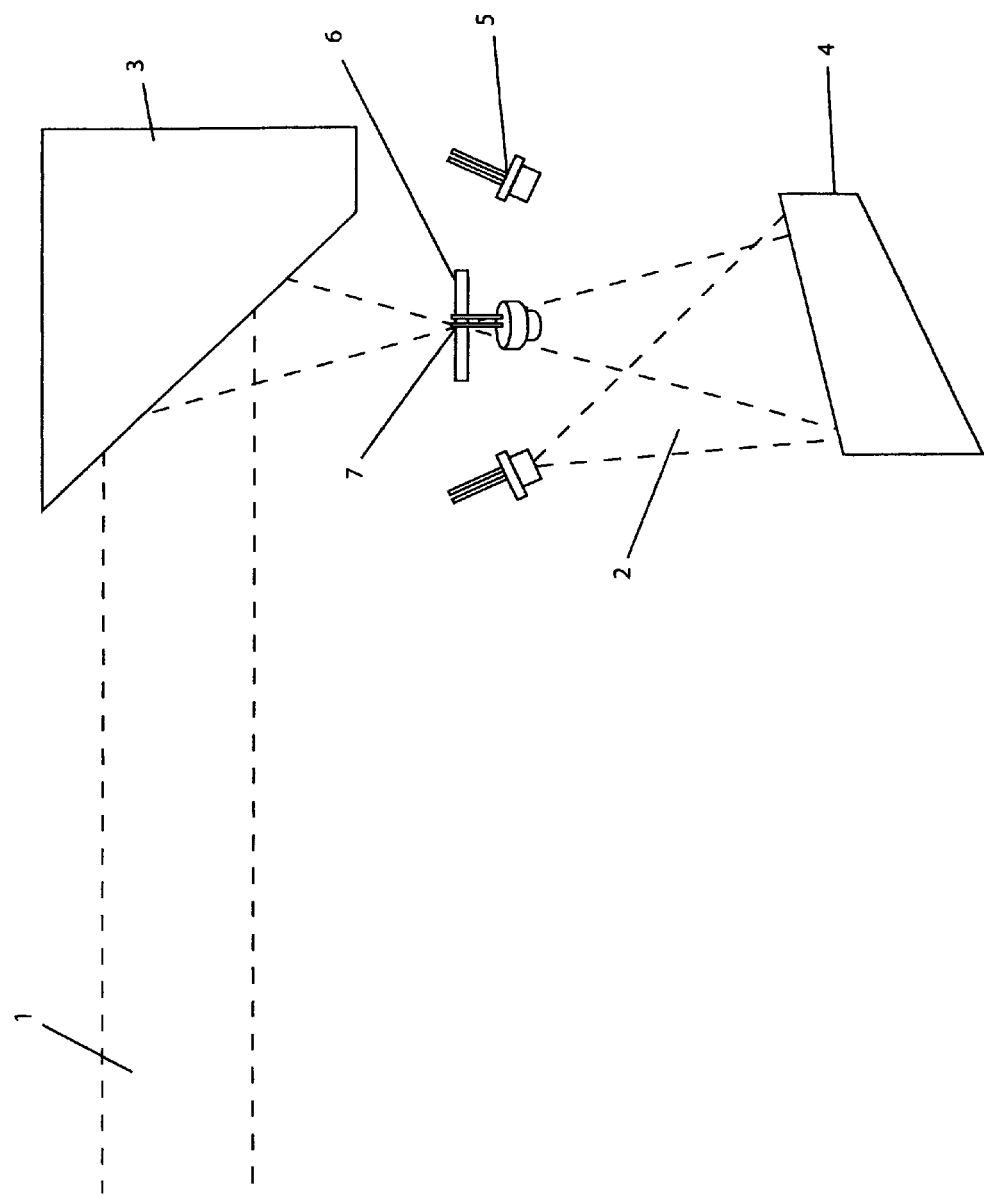
FIG. 1 shows the boresight collimating device of the preferred embodiment.
Figure 2:
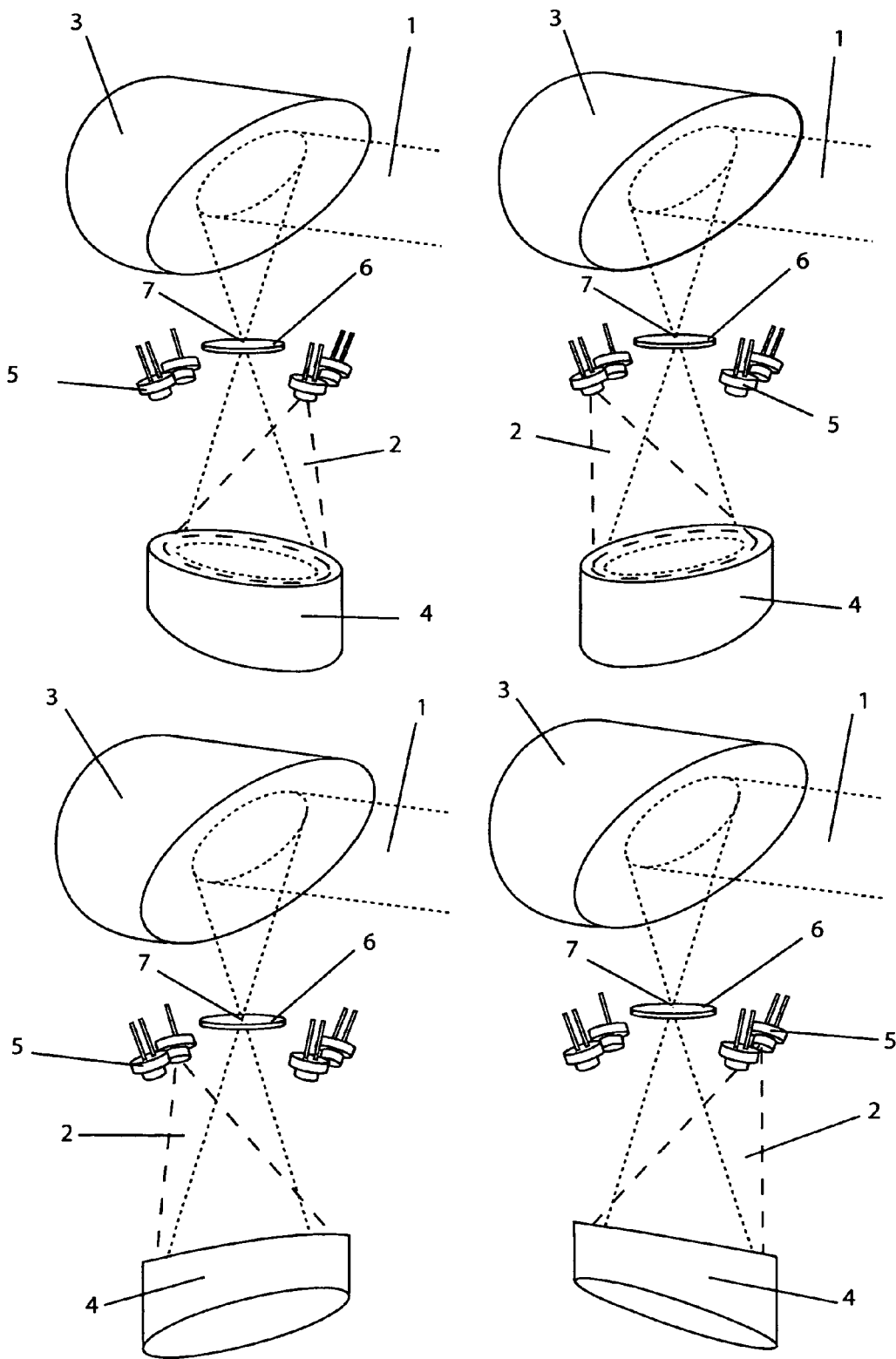
FIG. 2 shows four positions of the rotating elliptical mirror of the boresight collimating device using four illumination sources of the preferred embodiment.

In the preferred embodiment as shown in FIGS. 1 and 2 the illumination system employs a rotating elliptical mirror (4) that rotates about one of its foci. The illumination sources (5) creating multiple source beams (2) are placed at multiple locations, defined by the other foci of the rotating elliptical mirror (4), so that when the rotating elliptical mirror (4) is rotated each different source (5) is correctly positioned to reflect the source beam (2) at the foci (7) of the rotating elliptical mirror (4). The rotation of the rotating elliptical mirror (4) can also act as the electrical switch, turning on the appropriate source (5). When the source (5) is switched on, and correctly positioned with respect to the rotating elliptical mirror (4), it illuminates a pinhole (6) of the appropriate size for the system.

This pinhole/reticule (6) is then imaged using a parabolic mirror (3) having the same foci (7) as the rotating elliptical mirror (4), collimating the light output (1) so that the user sees an alignment dot/pattern in the sight/scope. The dot/pattern allows the user to align the sighting device using the reticule pattern within the boresight collimating device without firing the weapon.

Since certain changes may be made in the above described boresight collimating device without departing from the scope of the invention herein involved, it is intended that all matter contained in the description thereof or shown in the accompanying figures shall be interpreted as illustrative and not in a limiting sense.

What is claimed is:

1. An illumination system for a boresight collimating device comprising:
    a rotating elliptical mirror that rotates about one of its foci;
    a pinhole/reticule located at said foci;
    two or more illumination sources;
    each of said two or more illumination sources creating a source beam;
    each of said two or more illumination sources placed at a location such that when said rotating elliptical mirror is rotated each of said two or more illumination sources is correctly positioned to illuminate said rotating elliptical mirror and to reflect a source beam at the foci of said rotating elliptical mirror wherein when each of said two or more illumination sources is switched on and correctly positioned with respect to said rotating elliptical mirror each of said two or more illumination sources illuminates said pinhole/reticule;
    a parabolic mirror having the same foci as said rotating elliptical mirror;
    said pinhole/reticule being imaged by said parabolic mirror and said parabolic mirror collimating the light output from each of said two or more illumination sources as said rotating elliptical mirror rotates.

2. The illumination system of claim 1 wherein the rotation of said rotating elliptical mirror also acts as an electrical switch turning on each of said two or more illumination sources when each of said two or more illumination sources is correctly positioned to reflect the source beam at the pinhole/reticule and turning off each of said two or more illumination sources when each of said tow or more illumination sources in not correctly positioned to reflect the source beam at the pinhole/reticule.

* * * * *